US007684837B2

(12) United States Patent
Ito

(10) Patent No.: US 7,684,837 B2
(45) Date of Patent: Mar. 23, 2010

(54) CELLULAR PHONE AND CELLULAR PHONE MANUFACTURING METHOD

(75) Inventor: Takao Ito, Saitama (JP)

(73) Assignee: NEC Corporation, Tokyo (JP)

( * ) Notice: Subject to any disclaimer, the term of this patent is extended or adjusted under 35 U.S.C. 154(b) by 569 days.

(21) Appl. No.: 11/260,215

(22) Filed: Oct. 28, 2005

(65) Prior Publication Data
US 2006/0093134 A1 May 4, 2006

(30) Foreign Application Priority Data
Oct. 28, 2004 (JP) .............................. 2004-313767

(51) Int. Cl.
H04M 1/00 (2006.01)
H04M 9/00 (2006.01)
H01G 2/10 (2006.01)
H01G 9/08 (2006.01)
(52) U.S. Cl. .............. 455/575.3; 455/575.1; 455/575.8; 455/90.3; 455/505.1; 379/433.01; 379/433.1; 379/433.11; 379/433.13; 361/517; 361/519; 361/534; 361/535; 361/537
(58) Field of Classification Search .............. 455/575.3, 455/575.1, 575.8, 90.3, 550.1; 379/433.13, 379/433.01, 433.05, 433.1; 316/142, 724, 316/752, 796, 801
See application file for complete search history.

(56) References Cited

U.S. PATENT DOCUMENTS

| 5,689,824 | A  | * | 11/1997 | Nagai | ....................... 455/575.3 |
| 6,119,019 | A  | * | 9/2000  | Phelps | ...................... 455/575.3 |
| 6,687,518 | B1 | * | 2/2004  | Park | ......................... 455/575.1 |
| 6,788,551 | B2 | * | 9/2004  | Takagi | ........................ 361/814 |
| 6,975,890 | B2 | * | 12/2005 | Wu et al. | ................. 455/575.1 |
| 7,046,204 | B2 | * | 5/2006  | Satoh et al. | ................. 343/702 |
| 7,072,624 | B2 | * | 7/2006  | Zheng et al. | ............... 455/90.3 |
| 7,110,796 | B2 | * | 9/2006  | Lee | ............................ 455/566 |
| 7,426,406 | B2 | * | 9/2008  | Maatta et al. | ............ 455/575.1 |
| 2001/0034242 | A1 | * | 10/2001 | Takagi | ....................... 455/550 |
| 2002/0187803 | A1 | * | 12/2002 | Nakamura et al. | .......... 455/550 |
| 2004/0127269 | A1 |   | 7/2004  | Nonaka | |

(Continued)

FOREIGN PATENT DOCUMENTS

EP 1 148 693 10/2001

(Continued)

*Primary Examiner*—Huy Q Phan
(74) *Attorney, Agent, or Firm*—Sughrue Mion, PLLC

(57) ABSTRACT

A cellular phone and a manufacturing method thereof capable of achieving attractive design as well as high operating efficiency in the assembly process. A cellular phone comprises a first housing, a second housing, a first circuit board, a second circuit board, a flexible cable to electrically connect the first and second circuit boards, and a hinge that rotates about a prescribed rotation axis. When the first and second housings are in their open positions resulting from the rotation of the hinge, one edge of the second housing is located vertically above one edge of the first housing. The hinge includes hinge semi-cylindrical portions that form a hollow part capable of accommodating the flexible cable. The first and second circuit boards are mounted on the first and second housings, respectively. The flexible cable is accommodated in the hollow part. One end of the flexible cable is threaded through an aperture formed at the one edge of the second housing. A protection cover is attached to the one edge of the second housing to cover over the aperture.

5 Claims, 10 Drawing Sheets

U.S. PATENT DOCUMENTS

| | | | |
|---|---|---|---|
| 2004/0192422 A1* | 9/2004 | Watanabe et al. | 455/575.3 |
| 2005/0176475 A1* | 8/2005 | Sawamura | 455/575.3 |
| 2006/0287010 A1* | 12/2006 | Wada et al. | 455/575.1 |

FOREIGN PATENT DOCUMENTS

| | | | |
|---|---|---|---|
| EP | 1 217 699 | | 6/2002 |
| EP | 03006941.3 | * | 3/2003 |
| JP | 6-311216 | | 11/1994 |
| JP | 2821333 B2 | | 8/1998 |
| JP | 2003304310 | | 10/2003 |
| JP | 2004311596 | | 11/2004 |

* cited by examiner

CELLULAR PHONE AND CELLULAR PHONE MANUFACTURING METHOD

FIELD OF THE INVENTION

The present invention relates to a cellular phone with a hinge having a folding design and a manufacturing method thereof.

BACKGROUND OF THE INVENTION

In order to manufacture compact cellular phones with attractive designs, folding cellular phones have been developed.

FIG. 1 is a diagram showing an example of the construction of a conventional folding cellular phone. Referring to FIG. 1, the cellular phone comprises an upper housing 100, a lower housing 200 and a hinge 300. The upper housing 100 includes an earpiece or speaker, while the lower housing 200 includes a mouthpiece or microphone. The hinge 300 connects the upper and lower housings 100 and 200. The upper and lower housings 100 and 200 are mutually rotated about the hinge 300 as a rotation axis to fold the cellular phone.

The upper and lower housings 100 and 200 are provided at their one edges with hinge semi-cylindrical portions 301 and 302, respectively, as part of the hinge 300. The hinge semi-cylindrical portions 301 and 302 extend along about half the interior circumferential surface area of the hinge 300 with a radius approximately equal to that of the hinge 300.

Both the hinge semi-cylindrical portions 301 and 302 present a substantially hollow cylindrical appearance when the cellular phone is unfolded. That is, when the upper and lower housings 100 and 200 are in their open or spread positions, the semi-cylindrical hollows of the hinge semi-cylindrical portions 301 and 302 are arranged adjacent to each other on the same axis to form one hollow part in the hinge 300. In Japanese Patent No. 2821333, there is described in detail of the aforementioned construction of the hinge.

In the process of manufacturing the cellular phone, circuit boards are mounted on the upper and lower housings 100 and 200. FIG. 2 is a diagram showing the upper and lower housings 100 and 200 in their open positions and circuit boards to be mounted thereon. As can be seen in FIG. 2, a circuit board 401 is mounted on the upper housing 100, and a circuit board 402 is mounted on the lower housing 200. Mounted on the circuit boards 401 and 402 are integrated circuits each consisting of the integration of electronic components that implement the call transmission/reception function of the cellular phone. The circuit boards 401 and 402 are electrically connected via a flexible cable 403. As shown in FIG. 2, the flexible cable 403 is wound or twisted in a spiral with one turn, and flexible to the extent that no disconnection of wiring occurs even if it is bent to some degree.

FIG. 3 is a diagram showing the upper and lower housings 100 and 200 after the circuit boards 401 and 402 are mounted thereon. The cellular phone can be assembled by simply placing the circuit boards 401 and 402 on the upper and lower housings 100 and 200. This simple operation achieves high efficiency in the assembly process. In the process of mounting the circuit boards 401 and 402 on the upper and lower housings 100 and 200, the flexible cable 403 is accommodated in the hollow part formed of the hinge semi-cylindrical portions 301 and 302. Thereby, when the cellular phone as a completed product is folded and unfolded, the relative position of the flexible cable 403 does not change because of its flexibility, and also no disconnection of wiring occurs. The hinge 300 has the construction as described above, not only to place emphasis on factors such as miniaturization and design, but also to reserve the hollow part for accommodating the flexible cable 403 as well as to achieve high operating efficiency in the assembly process.

In order to ensure high operating efficiency, the assembly process necessarily requires such simple operation as just placing the circuit boards 401 and 402, which are electrically connected via the flexible cable 403, on the upper and lower housings 100 and 200. The hollow part formed of the hinge semi-cylindrical portions 301 and 302 arranged adjacent to each other on the same axis is essential for the operation.

FIG. 4 is another diagram showing another example of the construction of a conventional folding cellular phone. Referring to FIG. 4, the cellular phone comprises an upper housing 100, a lower housing 200 and a hinge 300. The upper housing 100 includes an earpiece or speaker, while the lower housing 200 includes a mouthpiece or microphone. The hinge 300 connects the upper and lower housings 100 and 200.

Similarly to those of FIG. 1, the upper and lower housings 100 and 200 are provided at their one edges with hinge semi-cylindrical portions 301 and 302, respectively. When the upper and lower housings 100 and 200 are in their open positions, the semi-cylindrical hollows of the hinge semi-cylindrical portions 301 and 302 are arranged adjacent to each other on the same axis to form one hollow part, in which a flexible cable is accommodated.

Besides, differently from those of FIG. 1, the edge of the lower housing 200 is arranged vertically above the edge of the upper housing 100. By virtue of this construction, the cellular phone as a completed product has a unique and creative design. In addition, the size of the cellular phone is reduced by the overlap of the upper and lower housings 100 and 200. Thus, further miniaturization can be achieved. On the other hand, it seems that the thickness of the cellular phone is increased by the overlap. In this regard, however, there is no problem if the cellular phone is so designed, for example, that the thickness of each housing is reduced, or the thickness of a rear cover attached to each housing is reduced.

As an advantage of the above construction, it may be cited that a certain degree of space is reserved, as compared to the cellular phone shown in FIG. 1, at the edge of the lower housing 200 on the side where the hinge 300 is formed. That is, it is possible to reserve an area around the hollow part. Thus, an additional component, especially a large and thick component, can be mounted on the area, which expands the freedom of the design of the cellular phone.

However, in the assembly process, the construction shown in FIG. 4 does not allow circuit boards to be simply placed on the upper and lower housings 100 and 200 in their open positions. This is because the part at the edge of the lower housing 200 indicated by white arrow "A" interferes with the process of accommodating the flexible cable in the hollow part formed of the hinge semi-cylindrical portions 301 and 302.

If the assembly process is altered to avoid the interference, the operating efficiency is reduced. More specifically, if one end of the flexible cable is threaded through an aperture at the edge of the lower housing 200 indicated by white arrow "A", and then connected to the circuit boards, the efficiency of the assembly process decreases compared to the case where the circuit boards, which have already been connected to the flexible cable, are simply placed on both the lower housings 100 and 200.

One approach to avoiding the decrease in the operating efficiency involves cutting off the edge of the lower housing 200 indicated by white arrow "A". However, in the case of the cellular phone assembled in the above manner into a completed product, the flexible cable that is supposed to be accommodated inside the phone is exposed at the edge of the lower housing 200 cut off during the assembly process. The exposure of the flexible cable detracts from the design and appearance of the cellular phone.

SUMMARY OF THE INVENTION

It is therefore an object of the present invention to provide a cellular phone and a manufacturing method thereof capable of achieving attractive design as well as high operating efficiency in the assembly process.

In accordance with an aspect of the present invention, to achieve the object mentioned above, there is provided a cellular phone comprising a first housing, a second housing, a first circuit board mounted on the first housing, a second circuit board mounted on the second housing, a flexible cable to electrically connect the first and second circuit boards, a hinge to allow the first and second housings to rotate about a prescribed rotation axis, and a protection cover. The first housing is provided at its first edge with a first substantially semi-cylindrical portion as part of the hinge whose central axis coincides with the rotation axis, while the second housing is provided at its second edge with a second substantially semi-cylindrical portion as part of the hinge whose central axis coincides with the rotation axis. When the first and second housings are in their open or spread positions resulting from the rotation of the hinge, the second edge is located vertically above the first edge. The first and second substantially semi-cylindrical portions form in the hinge one hollow part having a substantially cylindrical shape capable of accommodating the flexible cable. At the second edge is formed an aperture through which the flexible cable is threaded. The protection cover is attached to the second edge to cover over the aperture.

Preferably, the protection cover has hooks to be fixedly attached to the second edge, and the second edge has slots in which the hooks are engaged, respectively.

In accordance with another aspect of the present invention, there is provided a method of manufacturing a cellular phone comprising a first housing, a second housing, a first circuit board mounted on the first housing, a second circuit board mounted on the second housing, a flexible cable to electrically connect the first and second circuit boards, a hinge to allow the first and second housings to rotate about a prescribed rotation axis, and a protection cover, wherein the first housing is provided at its first edge with a first substantially semi-cylindrical portion as part of the hinge whose central axis coincides with the rotation axis, while the second housing is provided at its second edge with a second substantially semi-cylindrical portion as part of the hinge whose central axis coincides with the rotation axis, when the first and second housings are in their open positions resulting from the rotation of the hinge, the second edge is located vertically above the first edge, and the first and second substantially semi-cylindrical portions form in the hinge one hollow part having a substantially cylindrical shape capable of accommodating the flexible cable. The cellular phone manufacturing method comprises the steps of mounting the first and second circuit boards on the first and second housings, respectively, accommodating the flexible cable in the hollow part, forming an aperture at the second edge, threading one end of the flexible cable through the aperture, and attaching the protection cover to the second edge to cover over the aperture.

As is described above, in accordance with the present invention, it is possible to achieve attractive design as well as high operating efficiency in the assembly process of the cellular phone.

BRIEF DESCRIPTION OF THE DRAWINGS

The exemplary aspects and features of the present invention will become more apparent from the consideration of the following detailed description taken in conjunction with the accompanying drawings in which.

DESCRIPTION OF THE PREFERRED EMBODIMENT

Figure 1:
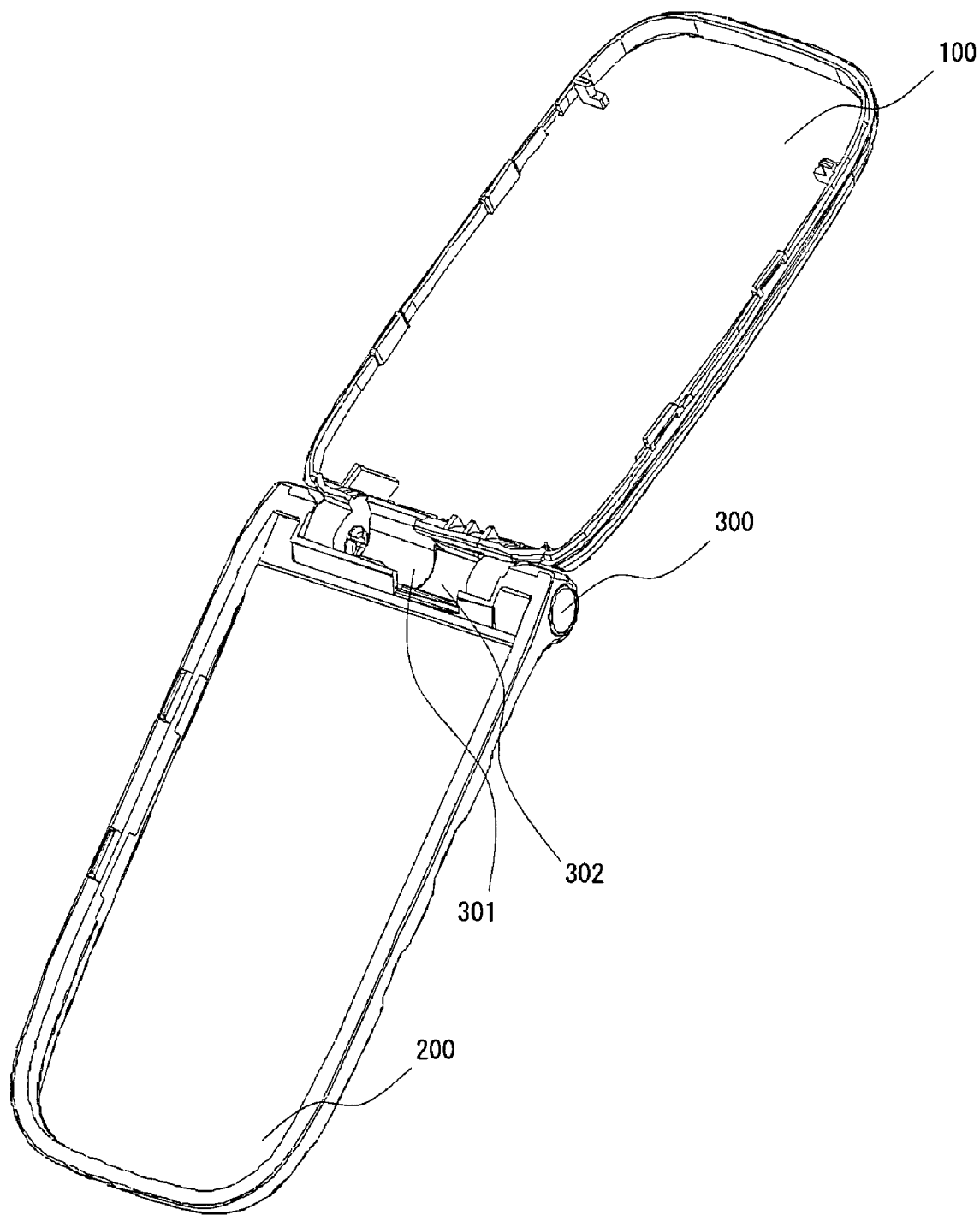
FIG. 1 is a diagram showing an example of a conventional cellular phone whose upper and lower housings are connected by a hinge.
Figure 2:
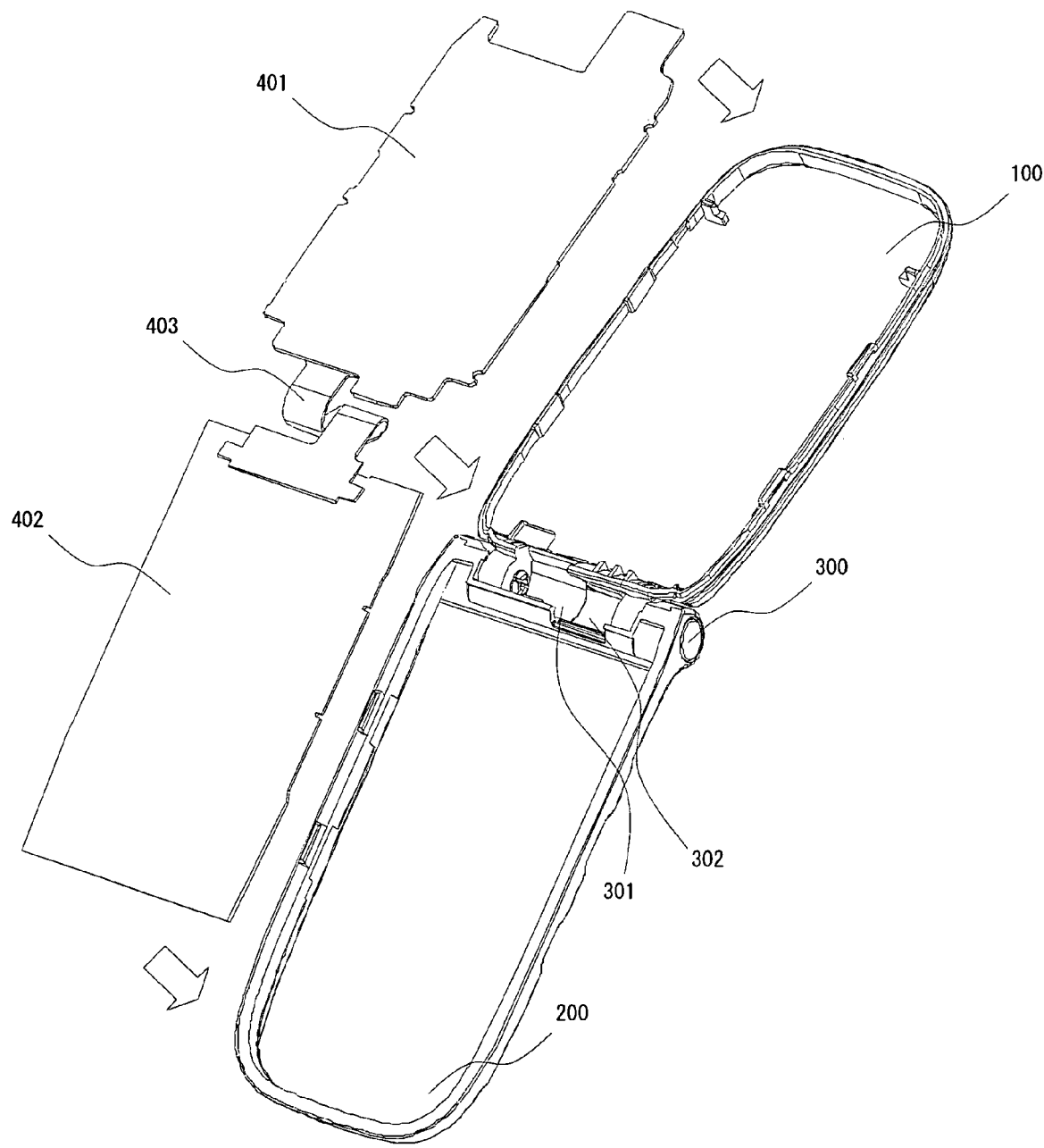
FIG. 2 is a diagram showing the upper and lower housings of the cellular phone and circuit boards to be mounted thereon.
Figure 3:
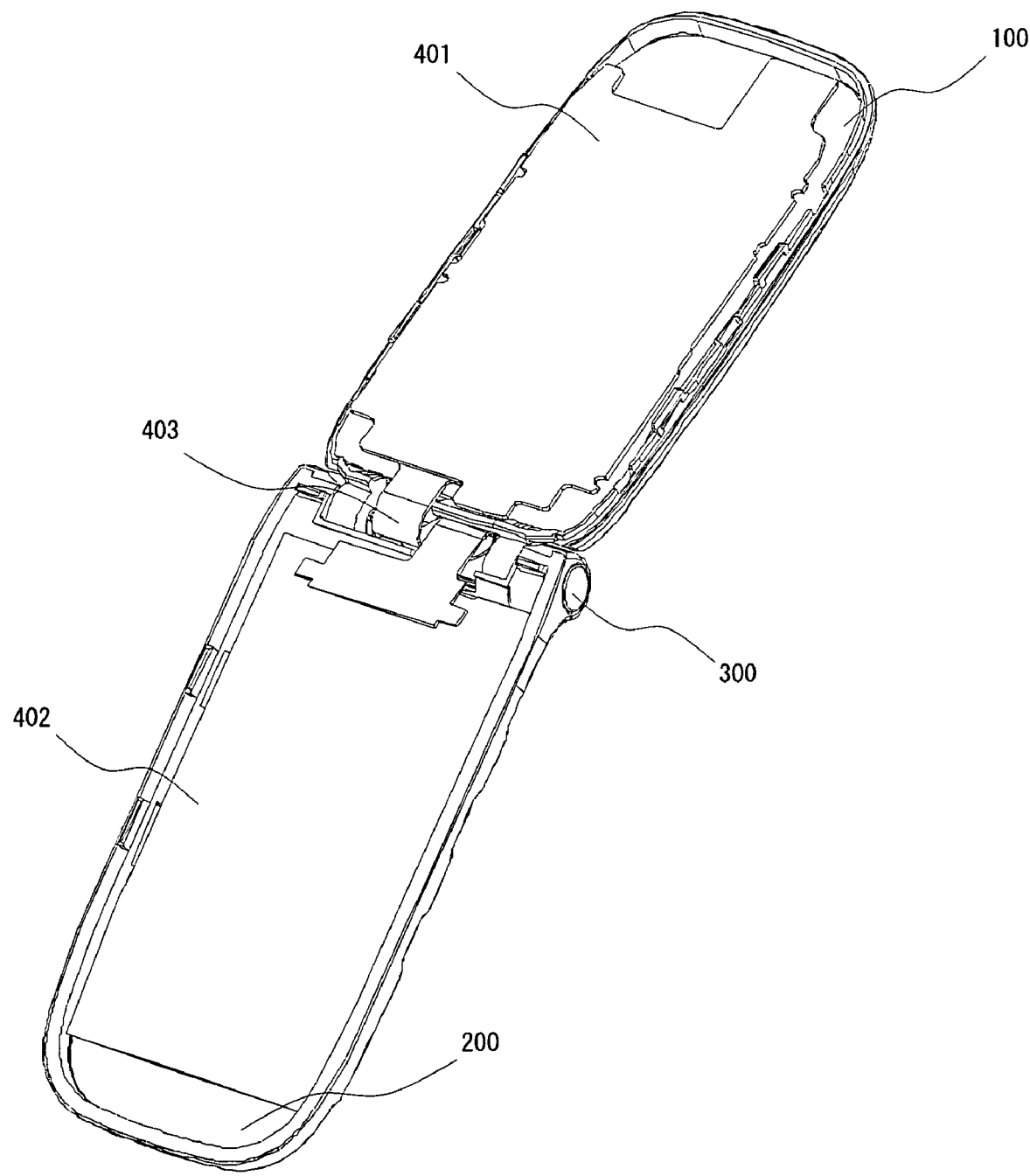
FIG. 3 is a diagram showing the upper and lower housings of the cellular phone with the circuit boards mounted thereon.

Referring now to the drawings, a description of a preferred embodiment of the present invention will be given in detail.

Figure 5:
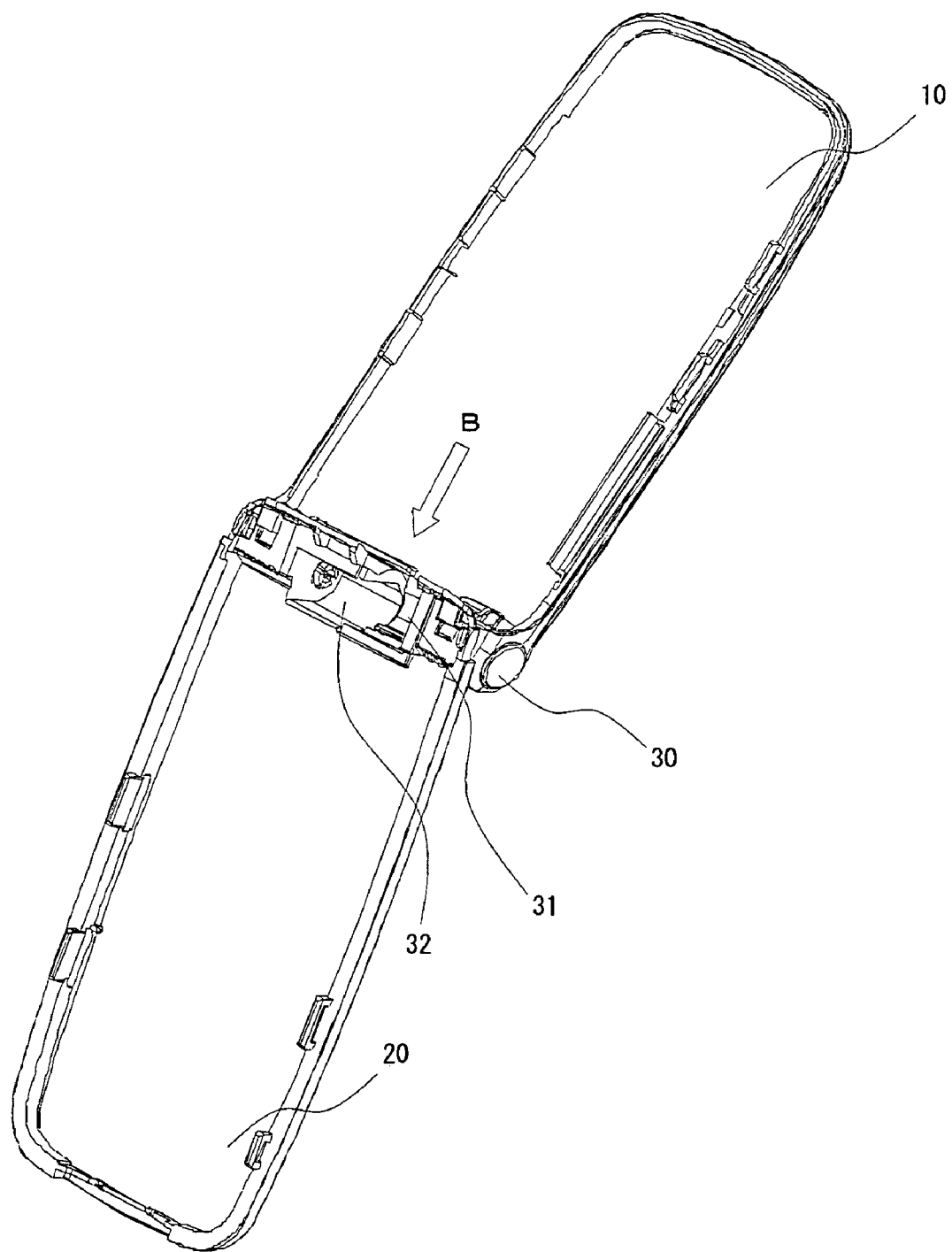
FIG. 5 is a diagram showing a cellular phone, whose upper and lower housings are connected by a hinge, according to an embodiment of the present invention.

FIG. 5 is a diagram showing the construction of a cellular phone according to an embodiment of the present invention. Referring to FIG. 5, the cellular phone comprises an upper housing 10, a lower housing 20 and a hinge 30.

The upper housing 10 includes, while not shown in the drawings, an earpiece or speaker for outputting sound or voice, and an LCD (Liquid Crystal Display) for displaying text, images, etc. that the user can view with a transparent cover thereon to protect the screen.

The lower housing 200 includes, while not shown in the drawings, a mouthpiece or microphone for inputting sound or voice, and a keyboard including numeric keys and other function keys or buttons through which the user provides input such as telephone number.

The hinge 30 connects the upper and lower housings 10 and 20. The upper and lower housings 10 and 20 are mutually rotated about the hinge 30 as a rotation axis to fold the cellular phone.

The upper housing 10 is provided at its one edge with a hinge semi-cylindrical portion 31. The hinge semi-cylindrical portion 31 extends semi-circumferentially along a portion of the interior surface area of the hinge 30 with a radius approximately equal to that of the hinge 30. The hinge semi-cylindrical portion 31 forms in the hinge 30 a hollow part (hereinafter referred to as first hollow part) having a substantially cylindrical appearance when the cellular phone is unfolded.

The lower housing 20 is provided at its one edge with a hinge semi-cylindrical portion 32. The hinge semi-cylindrical portion 32 also extends semi-circumferentially along a portion of the interior surface area of the hinge 30 with a radius approximately equal to that of the hinge 30. The hinge semi-cylindrical portion 32 forms in the hinge 30 a hollow part (hereinafter referred to as second hollow part) having a substantially cylindrical appearance when the cellular phone is unfolded.

With this construction, when the upper and lower housings 10 and 20 are in their open or spread positions, the first and second hollow parts are arranged adjacent to each other on the same axis to form one larger hollow part.

Figure 4:
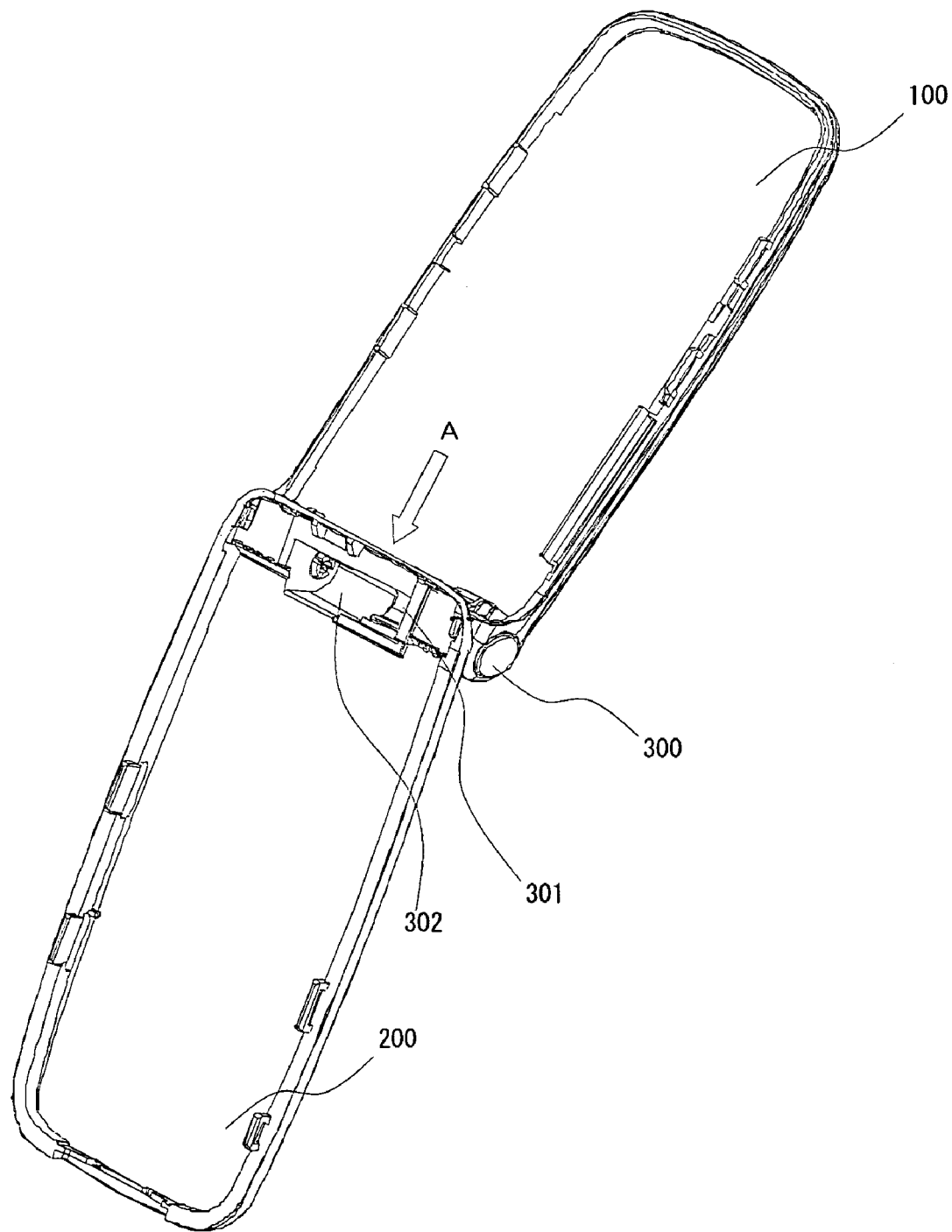
FIG. 4 is a diagram showing another example of a conventional cellular phone whose upper and lower housings are connected by a hinge.

Besides, as can be seen in FIG. 5, when the upper and lower housings 10 and 20 are in their open positions, the edges where the hinge 30 is formed are arranged one vertically above the other. That is, the edge of the lower housing 20 is arranged vertically above the edge of the upper housing 10 when the cellular phone is unfolded, similarly to those of FIG. 4.

In the edge of the lower housing 20 where the hinge 30 is formed, the part indicated by white arrow "B" is cut off to form an aperture. A protection cover (protection cover 50 described hereinafter with reference to FIG. 6) is attached to a portion of the edge including the aperture, which corresponds to one side of the cellular phone. Accordingly, in order to manufacture the lower housing 20 with the hinge 30, the design is made considering that the protection cover is to be attached thereto. More specifically, the design is such that, in the edge of the lower housing 20, the portion corresponding to one side of the cellular phone is reduced in thickness beforehand. Thereby, compared to a portion in the edge of the lower housing of a conventional cellular phone which corresponds to one side of the phone, the portion attached with the protection cover is nearly equal in thickness to the portion of the conventional cellular phone. Consequently, the design does not detract from the appearance of the cellular phone, and there is no special problem with the appearance of the phone as a completed product.

Figure 6:
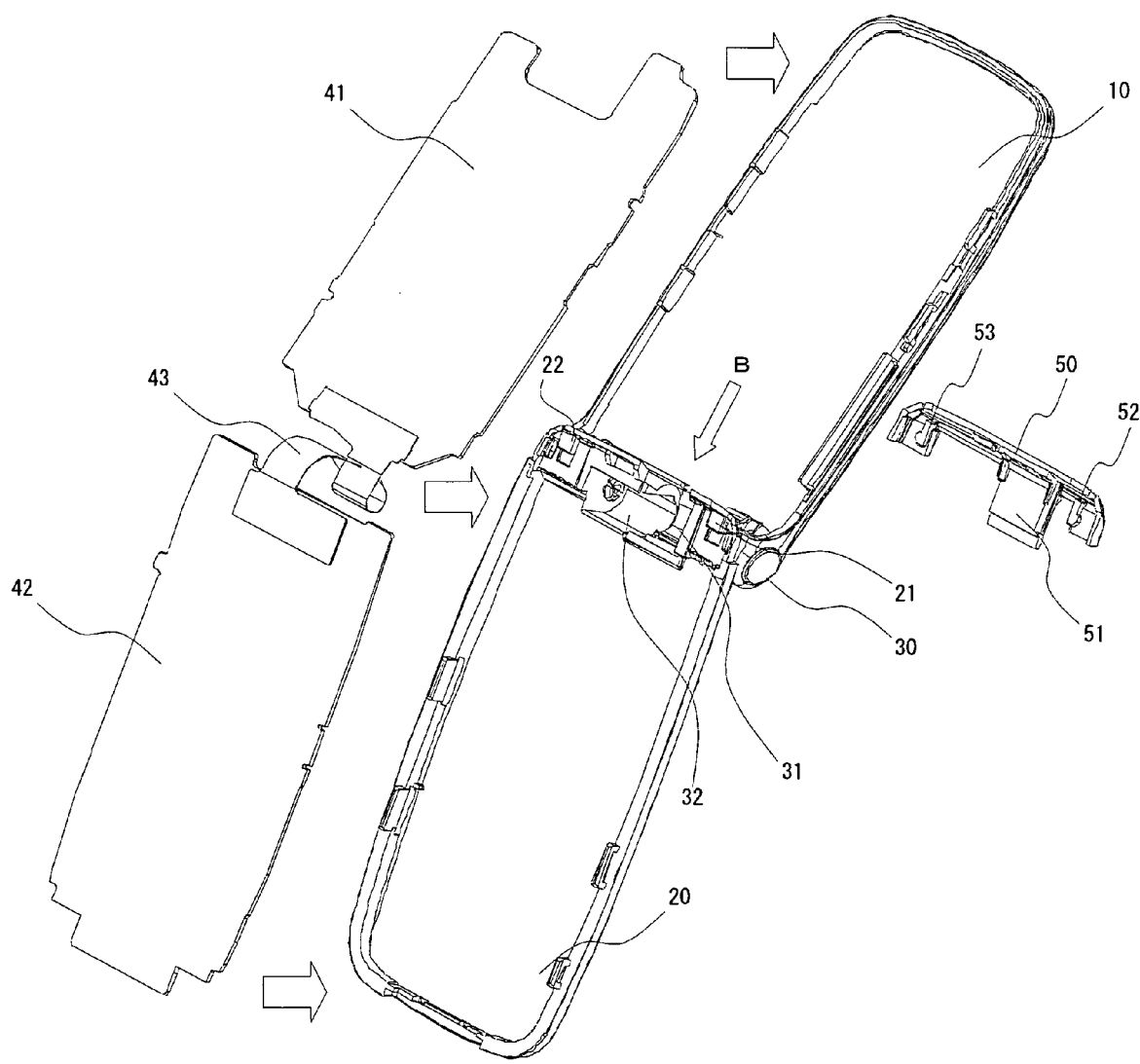
FIG. 6 is a diagram showing the upper and lower housings of the cellular phone, circuit boards to be mounted thereon and a protection cover.

In the process of manufacturing the cellular phone, circuit boards are mounted on the upper and lower housings 10 and 20. FIG. 6 is a diagram showing the upper and lower housings 10 and 20 in their open positions, circuit boards to be mounted thereon and a protection cover. As can be seen in FIG. 6, a circuit board 41 is mounted on the upper housing 10, and a circuit board 42 is mounted on the lower housing 20. Mounted on the circuit boards 41 and 42 are integrated circuits each consisting of the integration of electronic components that implement the call transmission/reception function, etc. of the cellular phone. The circuit boards 41 and 42 are electrically connected via a flexible cable 43. As shown in FIG. 6, the flexible cable 43 is wound or twisted in a spiral with one turn, and flexible to the extent that no disconnection of wiring occurs even if it is bent to some degree.

Besides, a protection cover 50 is attached to the edge of the lower housing 20 where the hinge 30 is formed. After having been attached to the edge, the protection cover 50 itself constitutes a part of the edge of the lower housing 20. Therefore, the protection cover 50 to be a constitutive part of the edge is reduced in thickness beforehand to maintain the design and appearance of the cellular phone. The protection cover 50 may be designed so that, when the cover 50 is attached to a portion in the edge of the lower housing 20, where the hinge 30 is formed, corresponding to one side of the cellular phone, the portion attached with the cover 50 is of substantially the same thickness as compared to a portion in the edge of the lower housing of a conventional cellular phone corresponding to one side of the phone.

The protection cover 50 has a function of protecting the flexible cable 43 accommodated in the first and second hollow parts. The protection cover 50 includes a cable cover 51 and hooks 52 and 53 to effectively accomplish the function.

When the protection cover 50 is attached to the edge of the lower housing 20 where the hinge 30 is formed, the cable cover 51 covers over the first hollow part. Accordingly, the cable cover 51 covers over the flexible cable 43 accommodated in the first hollow part as well as securing it therein. Thus, the cable cover 51 contributes to the protection of the flexible cable 43.

The hooks 52 and 53 are arranged on the right and left sides of the protection cover 50, respectively. The hooks 52 and 53 pass through slots 21 and 22 of the lower housing 20, respectively, to engage them. Since the hooks 52 and 53 are engaged in the slots 21 and 22, the protection cover 50 can be fixedly attached to the edge of the lower housing 20. Thus, the hooks 52 and 53 contribute to the protection of the flexible cable 43.

The hooks 52 and 53 are designed so that they can be released from the slots 21 and 22 when subjected to adequate stress. The release of the hooks 52 and 53 detaches the protection cover 50 from the edge of the lower housing 20. In other words, the protection cover 50 is detachable. If the cellular phone is damaged and the protection cover 50 has to be removed to repair the damage, the cover 50 can be reused after the repair. This design of the protection cover 50 is highly advantageous where the cellular phone needs repair compared to that of a protection cover which cannot be detached when once attached in the assembly process.

The cellular phone can be assembled by simply placing the circuit boards 41 and 42 on the upper and lower housings 10 and 20. On this occasion, the flexible cable 43 is accommodated in the first and second hollow parts. Then, one end of the flexible cable 43 is threaded through the aperture formed in the position indicated by white arrow "B". This simple operation achieves high efficiency in the assembly process.

Figure 7:
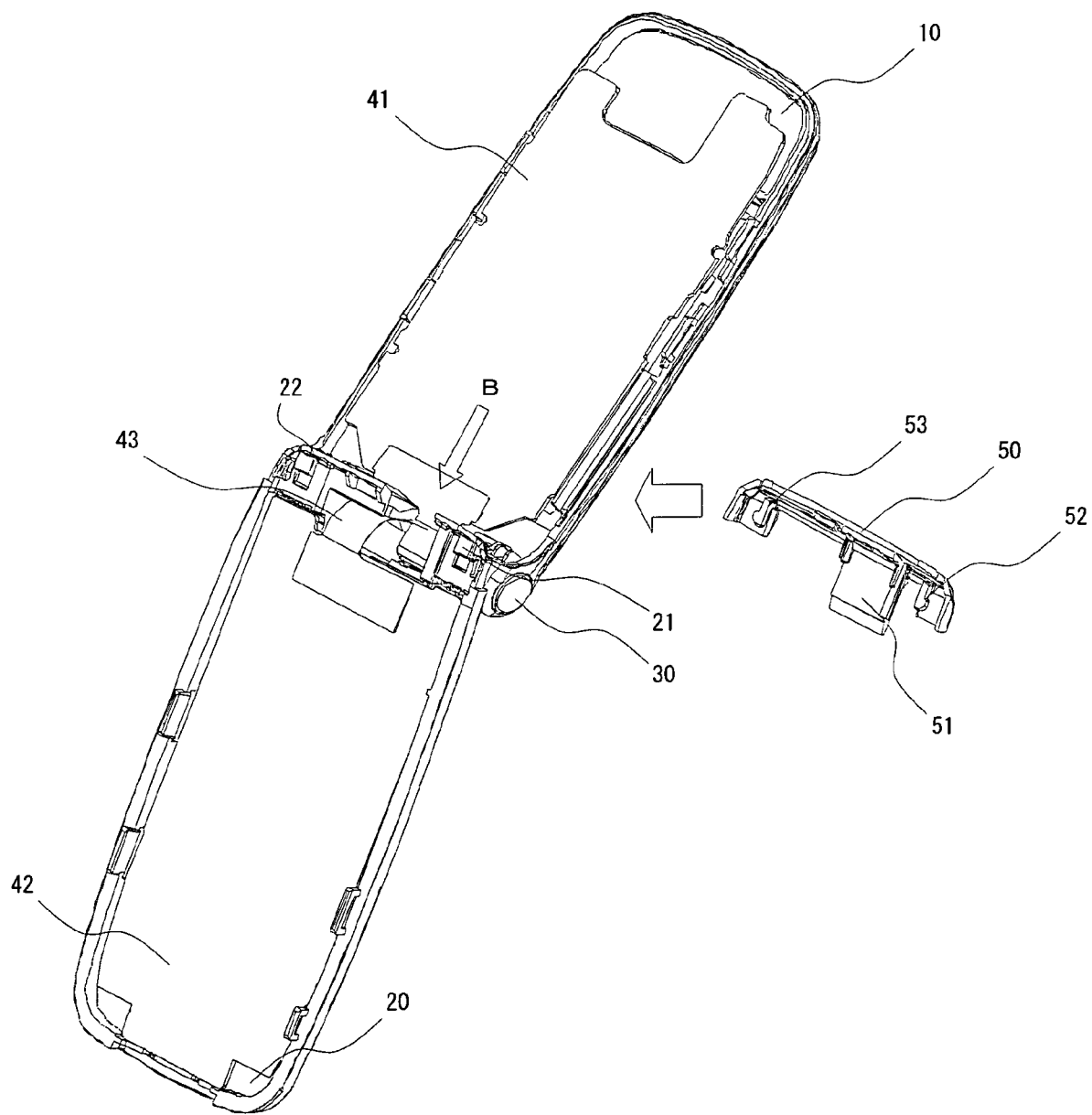
FIG. 7 is a diagram showing the upper and lower housings of the cellular phone with the circuit boards mounted thereon and the protection cover to be attached thereto.
Figure 8:
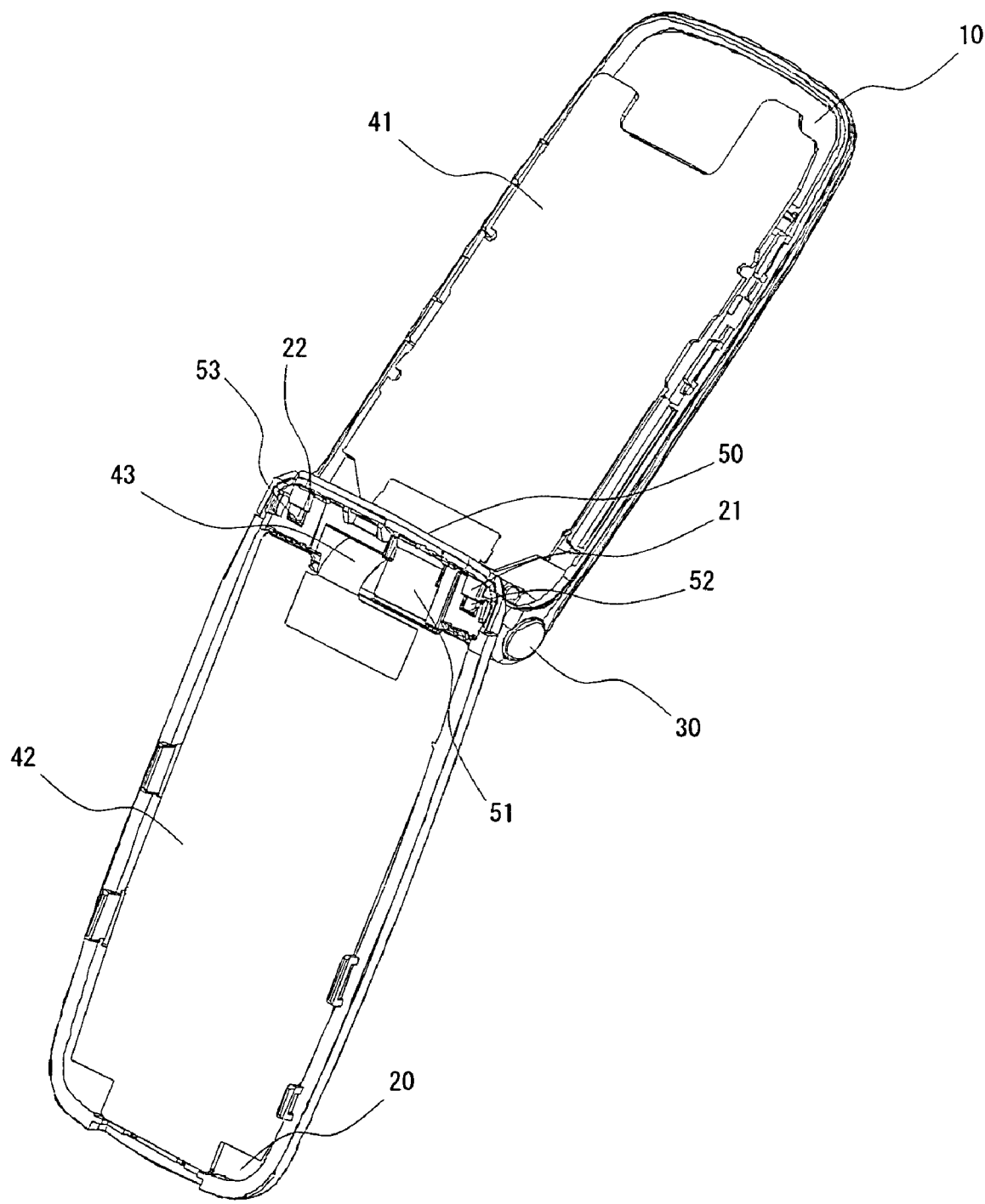
FIG. 8 is a diagram showing the upper and lower housings of the cellular phone with the circuit boards mounted thereon and the protection cover attached thereto.

FIG. 7 is a diagram showing the cellular phone just after the circuit boards 41 and 42 are mounted on the upper and lower housings 10 and 20, and the protection cover 50 to be attached thereto. Next, the protection cover 50 is attached to the edge of the lower housing 20 where the hinge 30 is formed. As shown in FIG. 7, the protection cover 50 is attached to the edge of the lower housing 20 with the circuit board 42 mounted thereon. The attachment only requires that the hooks 52 and 53 be passed through slots 21 and 22, respectively, and engaged in them. FIG. 8 is a diagram showing the cellular phone just after the protection cover 50 is attached to the edge of the lower housing 20. Since the hooks 52 and 53 are simply engaged in the slots 21 and 22 for the attachment of the protection cover 50, the assembly process is not impaired. Thus, it is possible to maintain operating efficiency.

In the assembly process, the protection cover 50 covers over the aperture formed in the position indicated by white arrow "B", and secures the flexible cable 43 accommodated in the first and second hollow parts. Thereby, when the cellular phone as a completed product is folded and unfolded, the relative position of the flexible cable 43 does not change because of its flexibility, and also no disconnection of wiring occurs.

Figure 9:
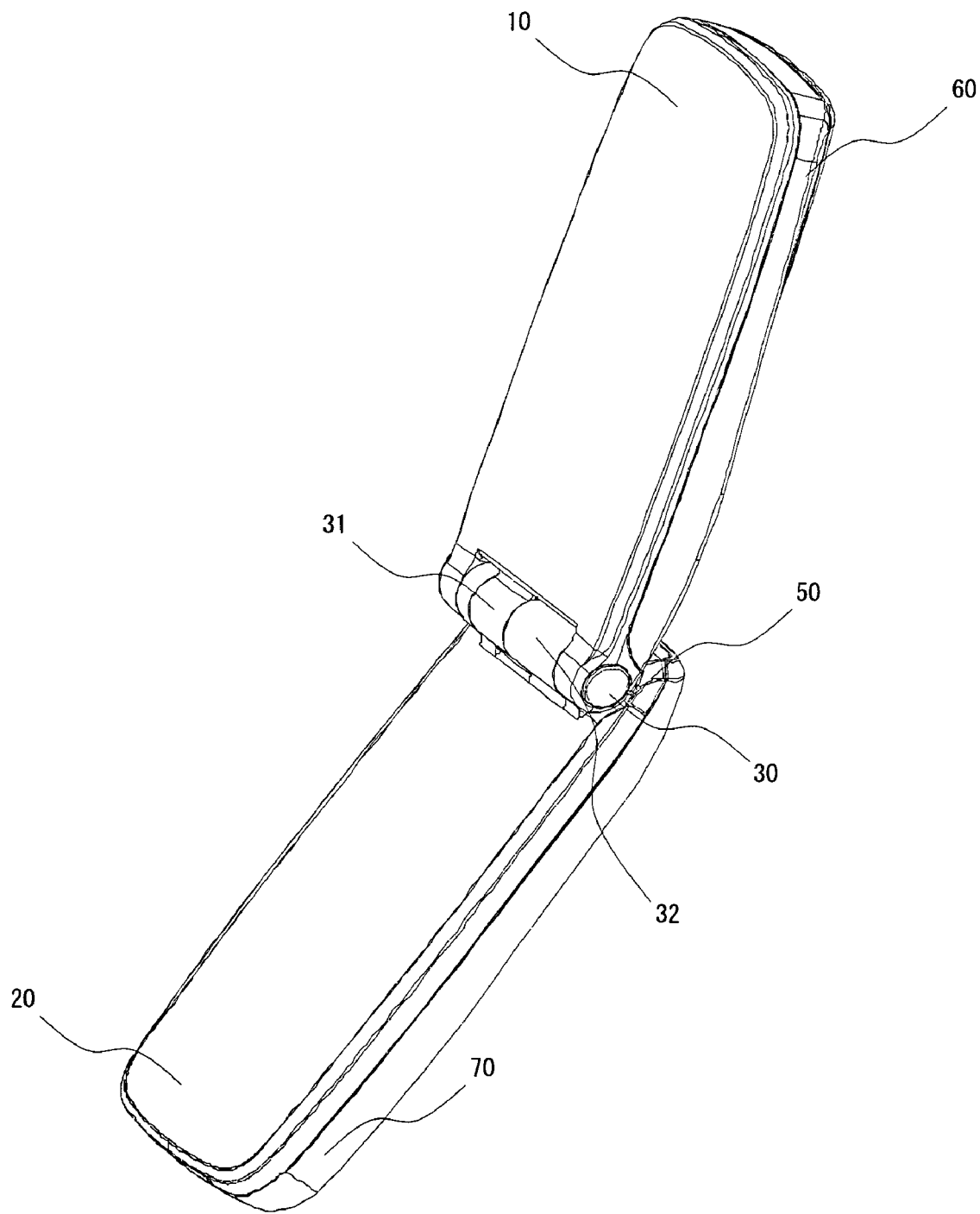
FIG. 9 is an oblique perspective view of the outward appearance of the cellular phone in open position.
Figure 10:
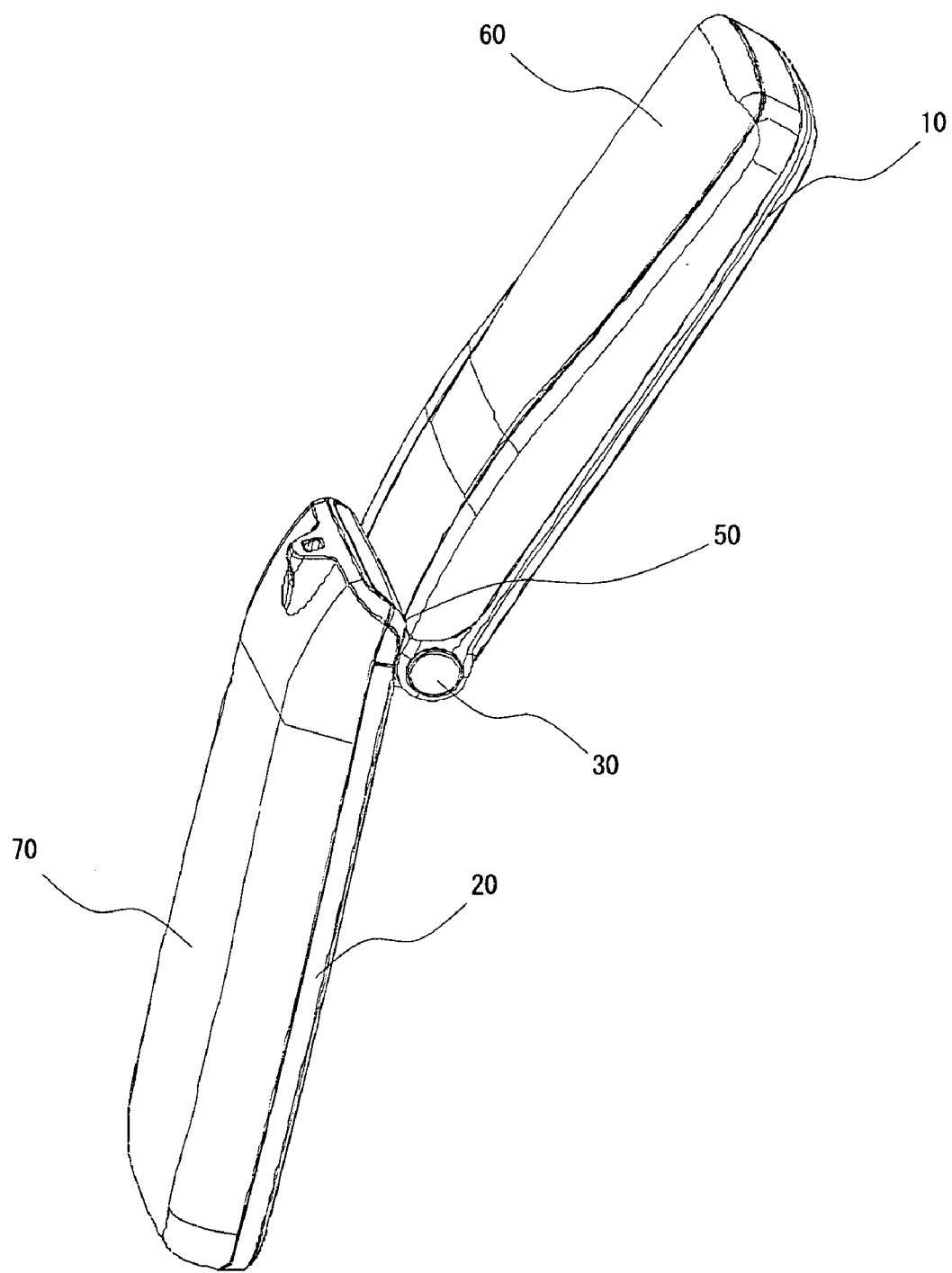
FIG. 10 is another oblique perspective view of the outward appearance of the cellular phone in open position.

After that, upper and lower rear covers 60 and 70, and other components of the cellular phone are attached to complete the assembly of the phone. FIG. 9 is an oblique perspective view of the outward appearance of the finished cellular phone in the open position, and mainly shows the upper and lower housings 10 and 20. FIG. 10 is another oblique perspective view of the outward appearance of the finished cellular phone in open position, and mainly shows the upper and lower rear covers 60 and 70.

Referring to FIGS. 9 and 10, the protection cover 50 constitutes to the appearance of the cellular phone. Without the protection cover 50, the flexible cable 43 accommodated in the first and second hollow parts is exposed, which detracts from the design of the entire cellular phone. That is, the protection cover 50 serves not solely a function of protecting the flexible cable 43 but also of preventing the exposure of the cable 43. By virtue of the functions, it is possible to maintain the design of the entire cellular phone.

Thus, it is possible to realize a cellular phone with a protection cover having a unique and creative design.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A cellular phone comprising a first housing, a second housing, a first circuit board mounted on the first housing, a second circuit board mounted on the second housing, a flexible cable to electrically connect the first and second circuit boards, a hinge to allow the first and second housings to rotate about a prescribed rotation axis, and a protection cover, wherein:
   the hinge includes:
   a first substantially semi-cylindrical portion whose central axis coincides with the rotation axis, which is provided at a first edge of the first housing disposed in parallel and above a horizontal plane; and
   a second substantially semi-cylindrical portion whose central axis coincides with the rotation axis, which is provided at a second edge of the second housing;
   when the first and second housings are in their open positions resulting from the rotation of the hinge, the second edge is located vertically above the first edge;
   the first and second substantially semi-cylindrical portions form one hollow part having a substantially cylindrical shape;
   the flexible cable is accommodated in the hollow part;
   at the second edge is formed an aperture through which the flexible cable is threaded; and
   the protection cover is attached to the second edge to cover over the aperture,
   wherein a width of the aperture is wider than a width occupied by the flexible cable in a direction along the prescribed rotation axis when the flexible cable is twisted a full turn.

2. The cellular phone claimed in claim 1, wherein:
   the protection cover has hooks to be fixedly attached to the second edge; and
   the second edge has slots in which the hooks are engaged, respectively.

3. The cellular phone according to claim 1, wherein when the first and second housings are in their open positions resulting from the rotation of the hinge, a center of rotation of the hinge is disposed between the first edge and the second edge.

4. A method of manufacturing a cellular phone comprising a first housing, a second housing, a first circuit board mounted on the first housing, a second circuit board mounted on the second housing, a flexible cable to electrically connect the first and second circuit boards, a hinge to allow the first and second housings to rotate about a prescribed rotation axis, and a protection cover, wherein:
   the hinge includes:
   a first substantially semi-cylindrical portion whose central axis coincides with the rotation axis, which is provided at a first edge of the first housing disposed in parallel and above a horizontal plane; and
   a second substantially semi-cylindrical portion whose central axis coincides with the rotation axis, which is provided at a second edge of the second housing;
   when the first and second housings are in their open positions resulting from the rotation of the hinge, the second edge is located vertically above the first edge; and
   the first and second substantially semi-cylindrical portions form one hollow part having a substantially cylindrical shape in which the flexible cable is accommodated;
   the method comprises the steps of:
   mounting the first and second circuit boards on the first and second housings, respectively;
   accommodating the flexible cable in the hollow part;
   forming an aperture at the second edge;
   threading one end of the flexible cable through the aperture; and
   attaching the protection cover to the second edge to cover over the aperture,
   wherein a width of the aperture is wider than a width occupied by the flexible cable in a direction along the prescribed rotation axis when the flexible cable is twisted a full turn.

5. The method according to claim 4, wherein when the first and second housings are in their open positions resulting from the rotation of the hinge, a center of rotation of the hinge is disposed between the first edge and the second edge.

* * * * *